United States Patent [19]
Ohno et al.

[11] Patent Number: 6,009,460
[45] Date of Patent: Dec. 28, 1999

[54] VIRTUAL REALITY SPACE SHARING SYSTEM HAVING SELF MODIFYING AVATARS (SYMBOLS) IN ACCORDANCE TO A CATEGORY THAT THE SYMBOL BELONGS

[75] Inventors: Takashi Ohno; Kazuki Matsui; Akinori Iwakawa; Naohisa Kawaguchi, all of Kawasaki, Japan

[73] Assignee: Fujitsu Limited, Kawasaki, Japan

[21] Appl. No.: 08/770,638

[22] Filed: Dec. 19, 1996

[30] Foreign Application Priority Data

Jul. 19, 1996 [JP] Japan .................................. 8-191086

[51] Int. Cl.[6] .............................. H04N 7/15; H04N 7/08; G06F 15/62; G10L 3/00
[52] U.S. Cl. .............................. 709/204; 714/38; 714/60; 714/62; 714/92; 348/13; 348/468
[58] Field of Search ........................ 395/183.14, 200.37, 395/200.47, 672, 200.34, 680, 12, 53, 60, 62, 92; 348/13, 468, 327, 552; 705/27, 10; 711/6

[56] References Cited

FOREIGN PATENT DOCUMENTS

| | | | |
|---|---|---|---|
| 697613A2 | 8/1995 | European Pat. Off. | G02B 27/01 |
| 8-63416 | 3/1994 | Japan . | |
| 6-121311 | 4/1994 | Japan . | |
| 6121311 | 4/1994 | Japan | H04N 7/15 |

OTHER PUBLICATIONS

Andre' LaMothe "Tricks of the Game Programming Gurus" pp. 444–446, 454 and 479, 1994.

*Primary Examiner*—Dung C. Dinh
*Assistant Examiner*—Hieu C. Le
*Attorney, Agent, or Firm*—Staas & Halsey LLP

[57] ABSTRACT

There is provided a communication apparatus, adapted to be used as a user terminal, connected to a message communication system in which a plurality of user terminals are interconnected, the plurality of user terminals sharing virtual worlds and avatars (symbols) of users each operating an associated one of the user terminals, and messages are exchanged among the plurality of user terminals while creating an atmosphere such that as if one's own self enters the virtual world and has conversations. In the communication apparatus, the users (symbols) are classified into a plurality of categories, and action contents of the symbols are controlled in accordance with the categories. According to the communication apparatus, a symbol with a great deal of individuality is produced, so that a virtual world full of variety may be implemented.

10 Claims, 17 Drawing Sheets

ACTION DATABASE FOR OBJECT

| CATEGORY | POSSIBLE ACTIONS |
|---|---|
| GENERAL USER 1 | SEE IN DETAIL |
| GENERAL USER 2 | 1+MOVEMENT |
| SALESCLERK | 2+MAKING UP AND DESTRUCTION |

Fig. 4 (A)

| STATUSES | USER'S STATUS VALUES |
|---|---|
| SYMBOL NAME | ... |
| SYMBOL IMAGE | ... |
| PRESENT POSITION | ... |
| ... | ... |
| ... | ... |
| VIRTUAL WORLD STAY TIME | ... |

Fig. 4 (B)

CATEGORY ALTERATION RULES

・CHANGE FROM GENERAL USER 1 TO GENERAL USER 2 WHEN "VIRTUAL WORLD STAY TIME" REACHES 10HRS.

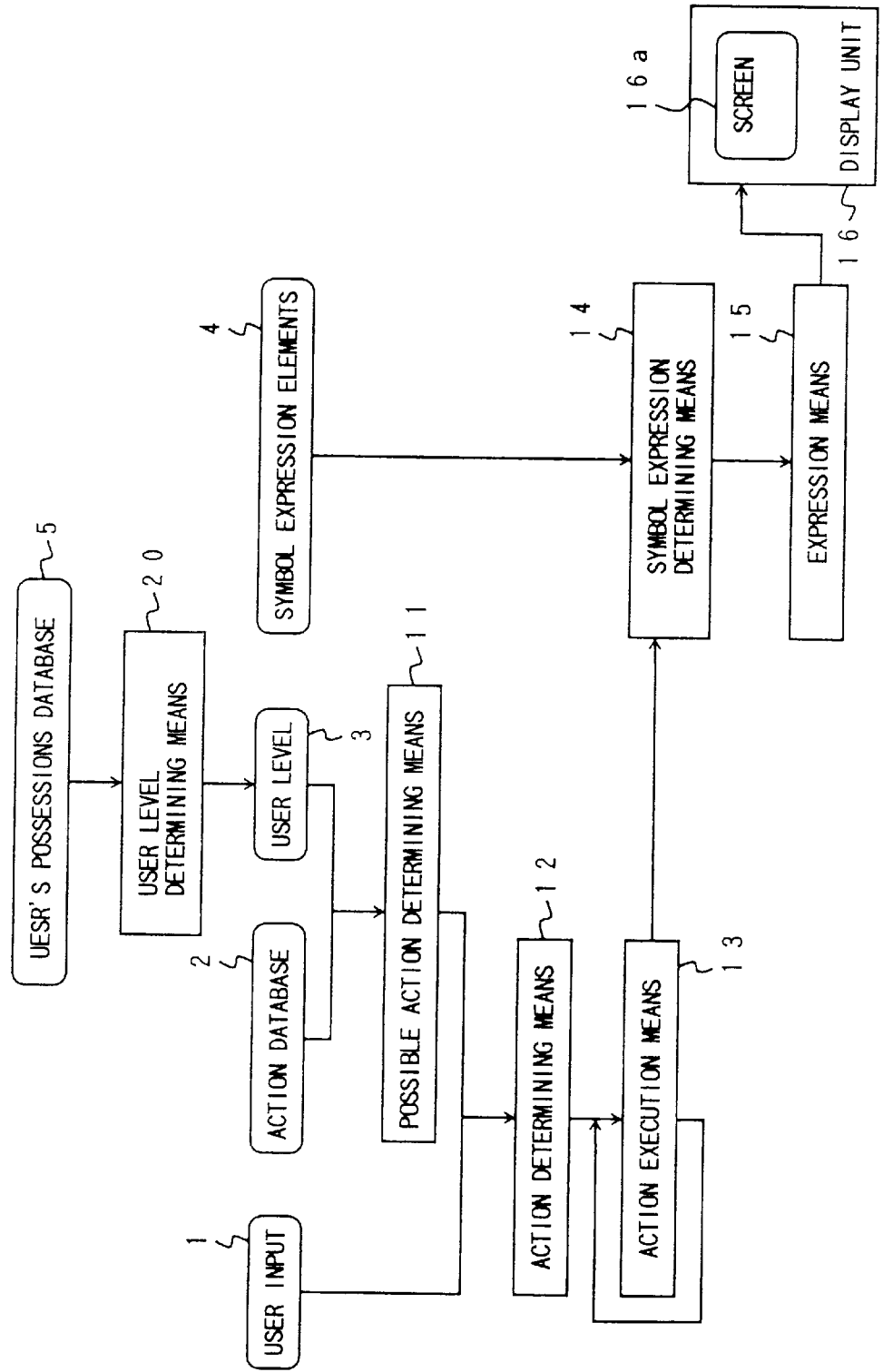

Fig. 8 (A)

| USER'S STATUS | |
|---|---|
| STATUSES | VALUES |
| SYMBOL NAME | ... |
| SYMBOL IMAGE | ... |
| PRESENT POSITION | ... |
| ... | ... |
| ... | ... |
| VIRTUAL WORLD STAY TIME | |
| POSSESSIONS | CERTIFICATE OF GENERAL USER 1 |

Fig. 8 (B)

| USER'S STATUS | |
|---|---|
| STATUSES | VALUES |
| SYMBOL NAME | ... |
| SYMBOL IMAGE | ... |
| PRESENT POSITION | ... |
| ... | ... |
| ... | ... |
| VIRTUAL WORLD STAY TIME | |
| POSSESSIONS | CERTIFICATE OF GENERAL USER 2 |

Fig. 8 (C)

| USER'S STATUS | |
|---|---|
| STATUSES | VALUES |
| SYMBOL NAME | ... |
| SYMBOL IMAGE | ... |
| PRESENT POSITION | ... |
| ... | ... |
| ... | ... |
| VIRTUAL WORLD STAY TIME | |
| POSSESSIONS | CERTIFICATE OF SALESCLERK |

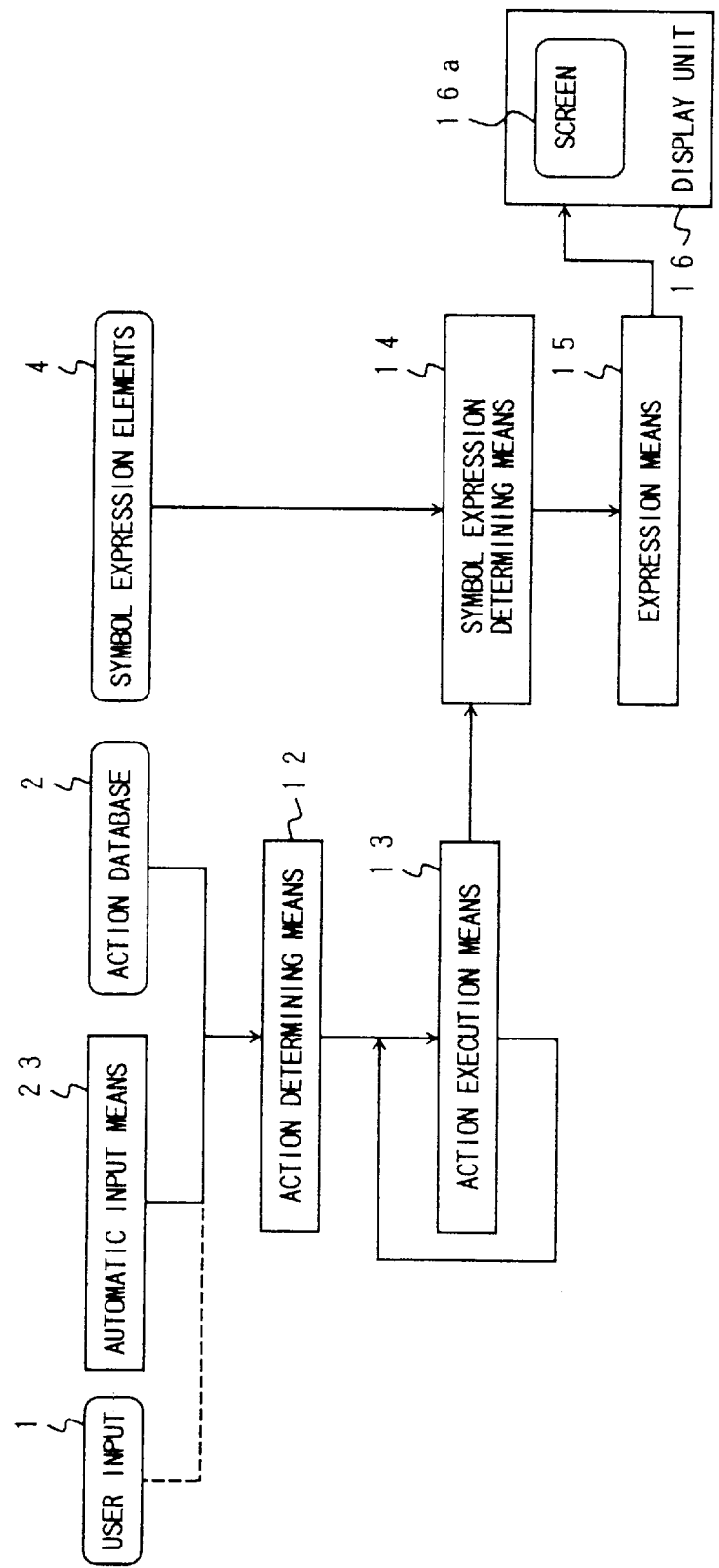

Fig.13(A)   Fig.13(B)
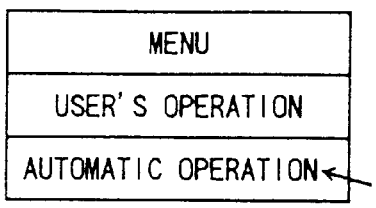
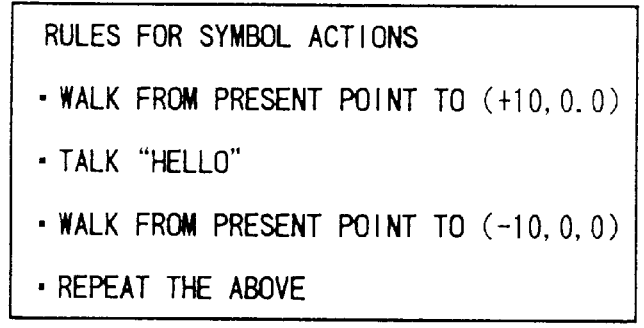
Fig.13(C)
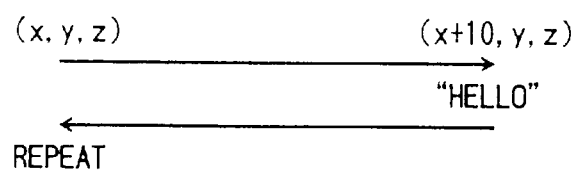

VIRTUAL REALITY SPACE SHARING SYSTEM HAVING SELF MODIFYING AVATARS (SYMBOLS) IN ACCORDANCE TO A CATEGORY THAT THE SYMBOL BELONGS

BACKGROUND OF THE INVENTION

Field of the Invention

The present invention relates to a communication apparatus connected to a message communication system in which a plurality of user terminals are interconnected, and messages are exchanged among the plurality of user terminals. The communication apparatus is utilized in the form of such a user terminal.

Recently, there has been developed a message communication system referred to as a so-called chat system in which messages are exchanged between user terminals through a so-called personal computer communication and the like.

FIG. 16 is a conceptual diagram of a message communication system comprising so-called servers and clients.

A plurality of user terminals, or a plurality of client computers 100_1, 100_2, . . . , 100_n are connected through a communication network 200 to a host computer 300 which serves as a server, so as to exchange messages among the client computers 100_1, 100_2, . . . , 100_n via the host computer 300.

In such a message communication system, there is known a system comprising a common virtual world when the system is viewed as a whole, and the client computers 100_1, 100_2, . . . , 100_n having their own symbols referred to as so-called avatars, in which the client computer, who intends to have a message exchange or communication, displays on its display screen the virtual world and avatars or symbols of the clients entered the virtual world just as if a plurality of clients, who are of interest in communication, enter the virtual world and have conversations.

FIG. 17 is an illustration showing exemplarily a display image of a client computer in which the virtual world and symbols as mentioned above are displayed.

In a virtual world display area 111 of a display screen 110 illustrated in FIG. 17, four persons (symbols of four clients) are displayed, and the total five persons including one's own self enter the same scene (virtual space) in the virtual world. A message exchange is performed among these five persons (five client computers). In a message display area 112 of the display screen 110, there are displayed messages exchanged among those five persons entered (five client computers). A click of scroll buttons 113a and 113b with the use of a mouse (not illustrated) makes it possible to scroll the display content in the message display area 112.

Hitherto, according to the above-mentioned message communication system having the virtual world and the symbols each in the form of an avatar of an user on a common basis, the symbols are distinguished from one another by means of changing a picture of plotting for each user to identify the user or naming the symbols to specify the users. However, the symbols have parts of the same quality in the virtual world. Thus, it is difficult to show individuality of the symbol. This raises such a problem that the virtual world itself is also merely produced in the poor individuality.

SUMMARY OF THE INVENTION

In view of the foregoing, it is therefore an object of the present invention to provide a communication apparatus suitable for a message communication system in which a symbol with a great deal of individuality is produced, so that a virtual world full of variety may be implemented.

To attain the above-mentioned object, according to the present invention, there is provided a communication apparatus, adapted to be used as a user terminal, connected to a message communication system in which a plurality of user terminals are interconnected, the plurality of user terminals sharing virtual spaces and symbols each defined for an associated one of the user terminals and acting in the virtual space in accordance with an instruction from the associated user terminal, and messages are exchanged among the plurality of user terminals while an image representative of a virtual world, in which the symbols are arranged in the virtual space, is displayed in the respective user terminals, said communication apparatus comprising:

possible action determining means for determining a possible action content of one's own symbol in accordance with a category to which one's own symbol defined on one's own communication apparatus belongs, among a plurality of categories each defining a possible action content permitted as an action of the symbol in the virtual world;

action determining means for determining an action of said one's own symbol within a limit of the possible action content determined by said possible action determining means;

action execution means for causing said one's own symbol to execute the action determined by said action determining means;

symbol expression determining means for determining an expression of said one's own symbol executed the action by said action execution means, the expression of said one's own symbol being caused by the executed action; and expression means for expressing on said image the symbol having the expression determined by said symbol expression determining means.

According to the communication apparatus of the present invention, symbols (users) are classified into a plurality of categories, and possible action contents are mutually varied for each category. Thus, the symbols share a part in accordance with the categories to which they belongs. This feature makes it possible to produce a symbol with a great deal of individuality, so that a virtual world full of variety may be implemented.

In the communication apparatus mentioned above, it is preferable that the communication apparatus further comprises category alteration means for altering a category of said one's own symbol in accordance with a behavior of said one's own symbol in the virtual world. This feature makes it possible to implement a virtual world more full of variety.

Further, in the communication apparatus mentioned above, it is preferable that said symbol expression determining means alters the expression of said one's own symbol in accordance with a category to which said one's own symbol belongs. Alteration of an expression of the symbol according to the category, for example, changing clothes, makes it possible to express a part of the symbol in the virtual world with a figure easy-to-identify for the user.

In the communication apparatus of the present invention, it is acceptable that said one's own symbol is permitted to possess a predetermined possession defining a category of said one's own symbol in the virtual world, and said possible action determining means determines a possible action content of said one's own symbol in accordance with the predetermined possession which said one's own symbol possesses. In this case, it is preferable that the communication apparatus further comprises possession transfer means for transferring one's own possession defining a category of said one's own symbol to another symbol. It is acceptable that the possession transfer means is one for transferring one's own possession defining a category of said one's own symbol to another symbol, upon copying and holding the same as one's own possession.

In this manner, when the communication apparatus is arranged in such a manner that possession for controlling a category of a symbol is defined and the possession is transferred, thereby altering the category of the symbol, it is possible to implement a virtual world more full of variety.

Further, in the communication apparatus of the present invention, it is preferable that the communication apparatus further comprises automatic input means for automatically inputting an action of said one's own symbol in accordance with a predetermined program. In this case, it is further preferable that said symbol expression determining means alters the expression of said one's own symbol, when an action of said one's own symbol is automatically inputted by said automatic input means, to an expression for action automatic input.

An arrangement, in which an action of one's own symbol is programmed beforehand and the action programmed beforehand may be automatically inputted, makes it possible to cause the symbol of the user to continue to move in the virtual world, even when the user rests from the operation. In case of the automatic operation, it is possible to inform another user of the fact that while one's own self enters the virtual world, one's own self does not operate one's own communication apparatus, by means of altering the expression of one's own symbol to the expression for action automatic input.

BRIEF DESCRIPTION OF THE DRAWINGS

FIG. 4(A) is a view showing a user's status table in which there is recorded the present status of one's own symbol in the communication apparatus shown in FIG. 3, and FIG. 4(B) is a view showing category alteration rules;

FIG. 7 is a schematic diagram showing a functional structure of a communication apparatus according to fourth embodiment of the present invention;

FIGS. 8(A)–8(C) are views showing various user's status tables in connection with the fourth embodiment of the present invention;

FIG. 12 is a schematic diagram showing a functional structure of a communication apparatus according to sixth embodiment of the present invention;

FIGS. 13(A), 13(B) and 13(C) are each an explanatory view useful for understanding an operation of the communication apparatus shown in FIG. 12;

DESCRIPTION OF THE PREFERRED EMBODIMENTS

Hereinafter, there will be described embodiments of the present invention, taking by way of example a store implemented in the virtual world.

Figure 1:
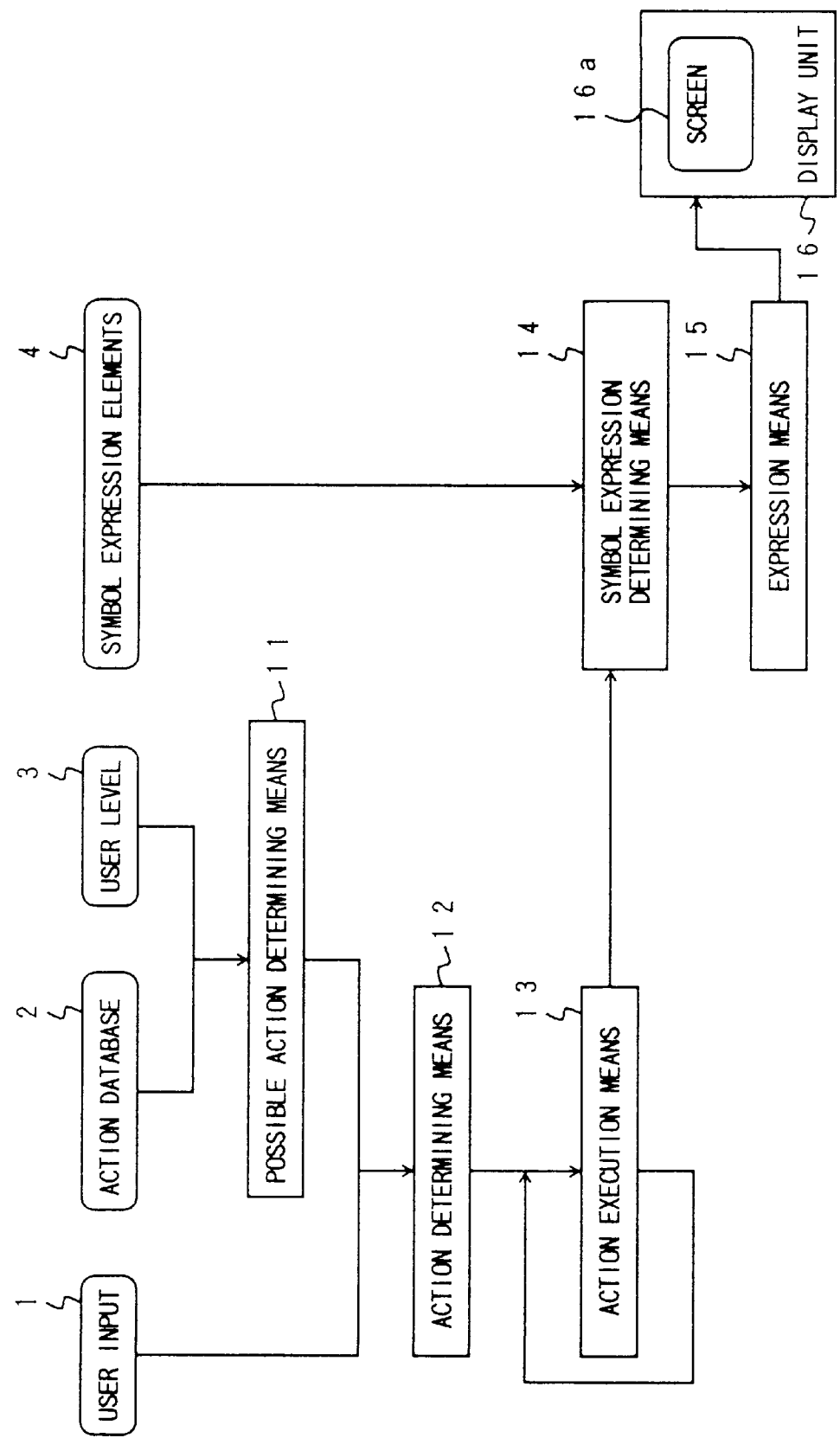
FIG. 1 is a schematic diagram showing a functional structure of a communication apparatus according to the first embodiment of the present invention.
Figure 2:
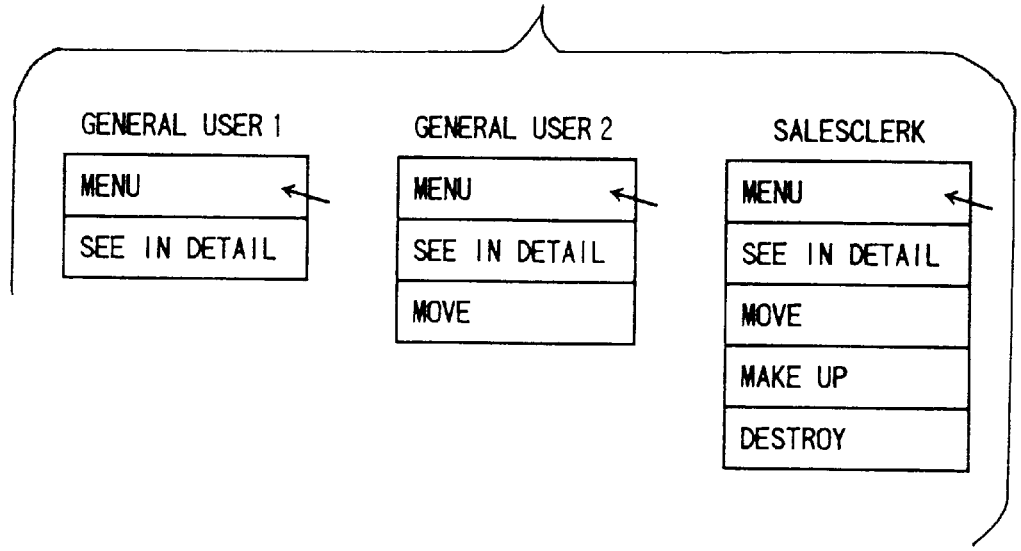
FIG. 2(A) is a view showing an action database in connection with the first embodiment of the present invention.
FIG. 2(B) is a view showing category-specific menu screens.

FIG. 1 is a schematic diagram showing a functional structure of a communication apparatus according to the first embodiment of the present invention. FIG. 2(A) is a view showing an action database in connection with the first embodiment of the present invention, and FIG. 2(B) is a view showing category-specific menu screens.

The communication apparatus shown in FIG. 1 incorporates thereinto, as an action database 2, for example, an action database shown in FIG. 2(A).

A category is classified into "general user 1", "general user 2" and "salesclerk". The possible actions content of the user (symbol) belonging to the category "general user 1" is to "see in detail" goods in the store; the user (symbol) belonging to the category "general user 2" is able to not only "see in detail" goods, but also touch and "move" goods; and the user (symbol) belonging to the category "salesclerk" is able to not only "see in detail" and "move" goods, but also "make up" (exhibit) and "destroy" (remove) goods in the store.

In the communication apparatuses, which are associated with the users belonging to "general user 1", "general user 2" and "salesclerk", respectively, when the operating menus of their own avatars (or symbols) are opened, the menu screens mutually different according to the user's possible actions content are displayed, respectively, as shown in FIG. 2(B). According to this system, it is permitted to select optionally actions only from among the possible actions content defined by the category to which oneself belongs.

Next, referring to FIG. 1, there will be explained the functional structure of the communication apparatus capable of implementing the above-mentioned function.

A possible action determining means 11 refers to the action database 2 and user's level (category) 3 of one's own self to determine an possible action content of one's own symbol, so that it is permitted to select optionally actions only from among the possible actions content of one's own symbol.

When an action is selected through a user operation from among the operating menus present in one's own level (category) and a user input 1 is inputted to the communication apparatus of one's own self, an action determining means 12 determines an action of one's own symbol in accordance with the user input 1 thus inputted. An action execution means 13 causes one's own symbol to execute the action or performance determined by the action determining means 12.

Figure 16:
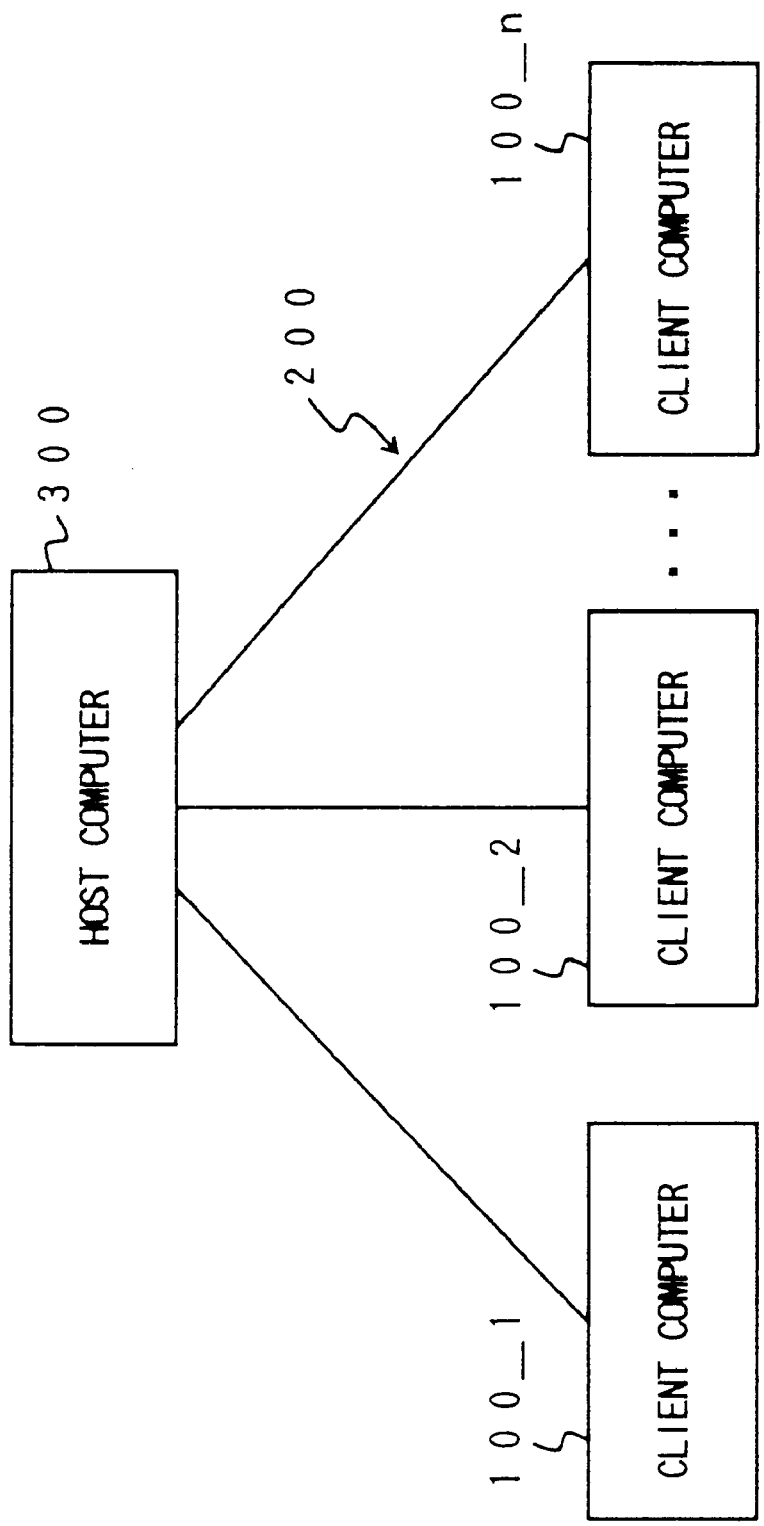
FIG. 16 is a conceptual diagram of a message communication system comprising so-called servers and clients.
Figure 17:
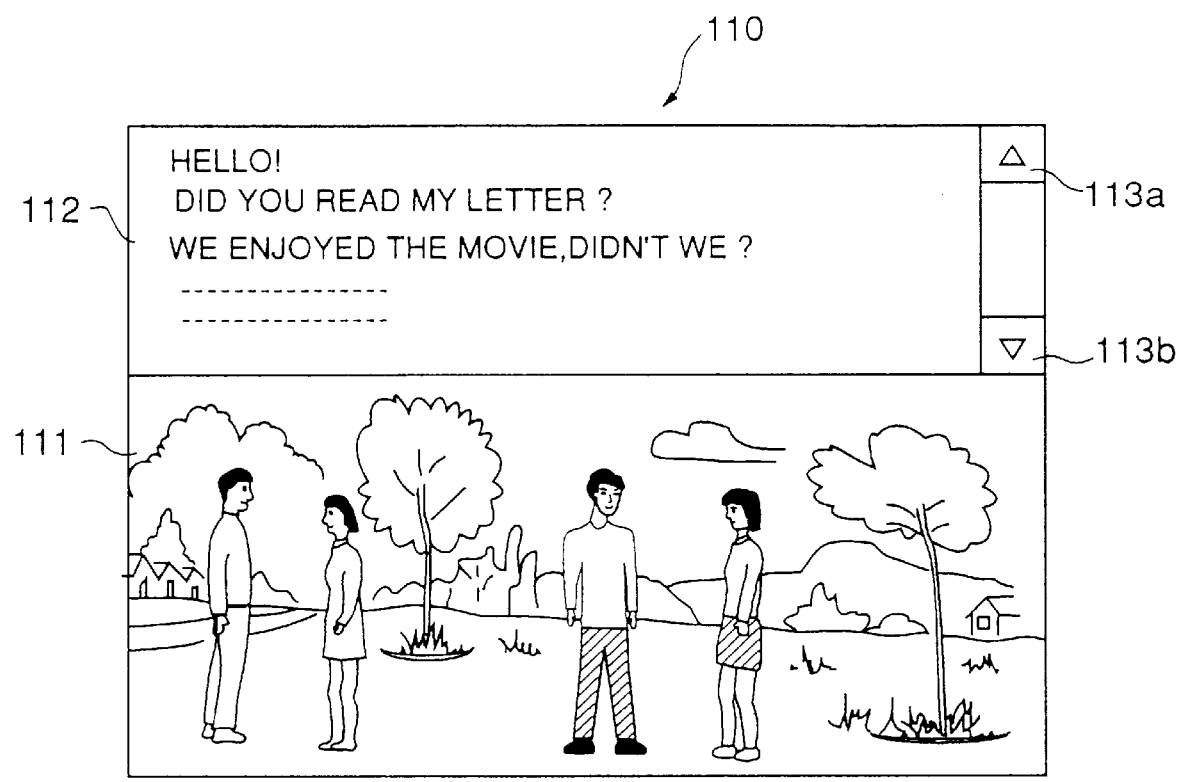
FIG. 17 is an illustration showing exemplarily a display image of a client computer in which the virtual world and symbols are displayed.

A symbol expression determining means 14 refers to symbol expression elements 4, such as various expression elements, for example, an expression caused by the action raising one's hand, an expression representative of a smile, to determine an expression of one's own symbol, which symbol executed the action in accordance with the action execution means 13, the expression of one's own symbol being caused by the executed action. An expression means 15 expresses on an image the symbol having the expression determined by the symbol expression determining means 14. Specifically, the symbol having such an expression is plotted on a display screen 16a of an image display unit 16 of the communication apparatus of one's own self, while the expression of one's own symbol is transmitted to another user (a communication apparatus of the another user) via a host computer (cf. FIG. 16). Also in the communication apparatus received the symbol expression, the symbol having such an expression is plotted on a display screen of an image display unit of the communication apparatus of party.

Figure 3:
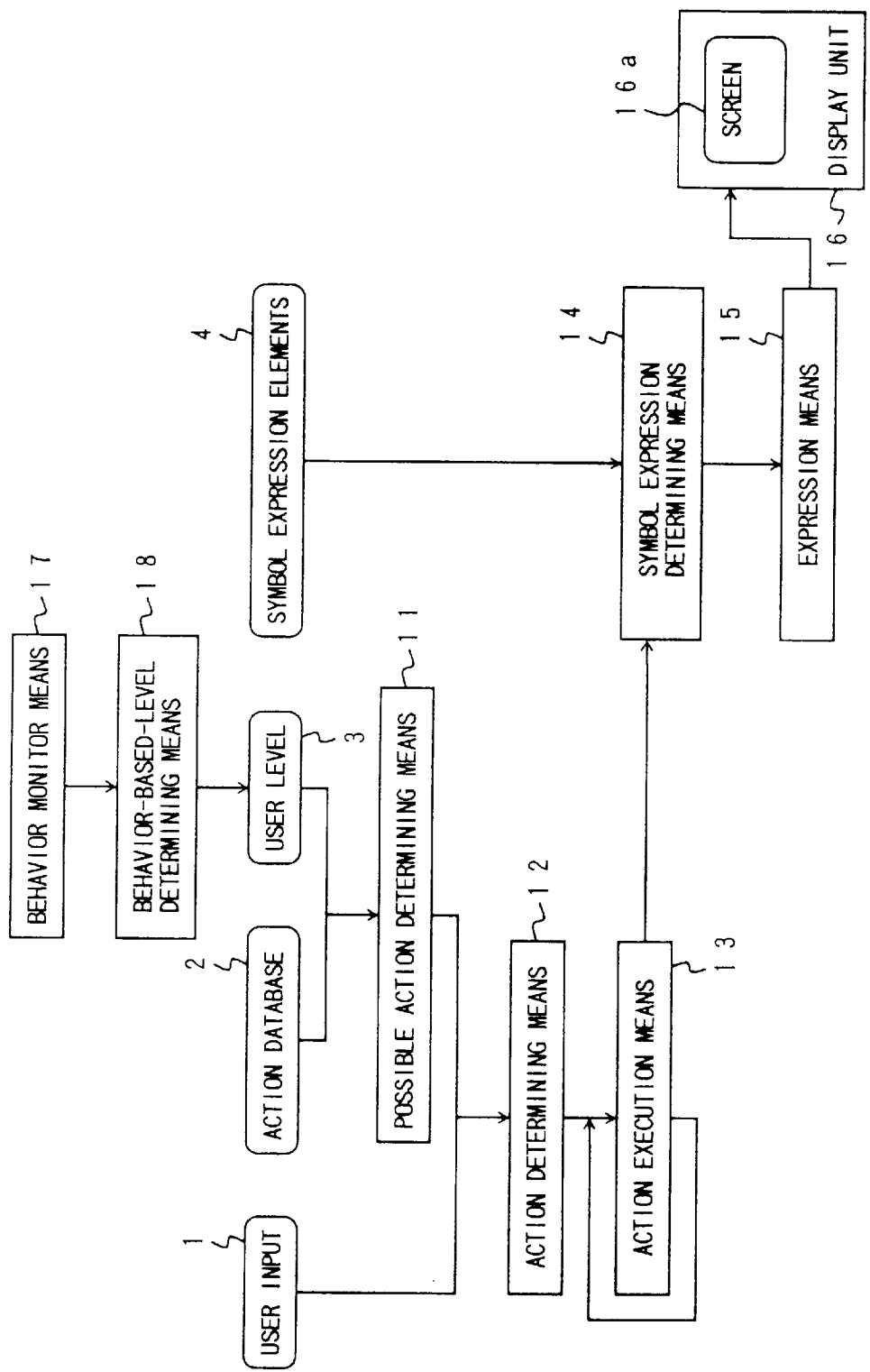
FIG. 3 is a schematic diagram showing a functional structure of a communication apparatus according to the second embodiment of the present invention.

FIG. 3 is a schematic diagram showing a functional structure of a communication apparatus according to the second embodiment of the present invention. FIG. 4(A) is a view showing a user's status table in which there is recorded the present status of one's own symbol in the communication apparatus shown in FIG. 3, and FIG. 4(B) is a view showing category alteration rules.

In a user's status table shown in FIG. 4(A), there are recorded a "symbol name" (name of a symbol of the associated user), a "symbol image" (image of the symbol), a "present position" (present coordinate position of one's own symbol in the virtual world) and the like, and a "virtual world stay time" (length of one's own symbol in the virtual world) as well. The "virtual world stay time" is updated at intervals of a predetermined time while one's own symbol acts in the virtual world.

In the communication apparatus shown in FIG. 3, as shown in FIG. 4(B), there is determined such a category alteration rule that when "virtual world stay time" reaches 10 hours, a category is changed from "general user 1" to "general user 2". Consequently, when "virtual world stay time" in the user's status table (FIG. 4(A)) is less than 10 hours, there is given the category (cf. FIGS. 2(A) and 2(B)) of "general user 1" for one's own symbol. On the other hand, when "virtual world stay time" reaches 10 hours, the category of one's own symbol is changed from "general user 1" to "general user 2", so that the user can not only see goods in the store, but also touch and move the goods.

Next, referring to FIG. 3, there will be explained the functional structure of the communication apparatus capable of implementing the above-mentioned function.

The communication apparatus shown in FIG. 3 comprises, in addition to the respective blocks constituting the communication apparatus shown in FIG. 1, behavior monitor means 17 and behavior-based-level determining means 18. The combination of behavior monitor means 17 and behavior-based-level determining means 18 corresponds to a category alteration means 18 referred to in the present invention.

The behavior monitor means 17 monitors a behavior of one's own symbol. According to the present embodiment, specifically, the behavior monitor means 17 monitors how long one's own symbol stays in the virtual world, although the present invention does not give a restriction on a point that a category is altered on the basis of what behavior of the symbol.

The category alteration means 18 determines the category (user level) of one's own symbol on the basis of the behavior monitored by the behavior monitor means 17. According to the present embodiment, as described referring to FIGS. 4(A) and 4(B), the category alteration means 18 determines the category (user level) of one's own symbol to "general user 1" or "general user 2" according as the stay time of one's own symbol in the virtual world is less than 10 hours or over 10 hours, respectively.

A possible action determining means 11 shown in FIG. 3 determines a possible action content of one's own symbol in accordance with the action database 2 (cf. FIG. 2(A)) and user level 3 of one's own symbol determined in the fashion as mentioned above.

Figure 5:
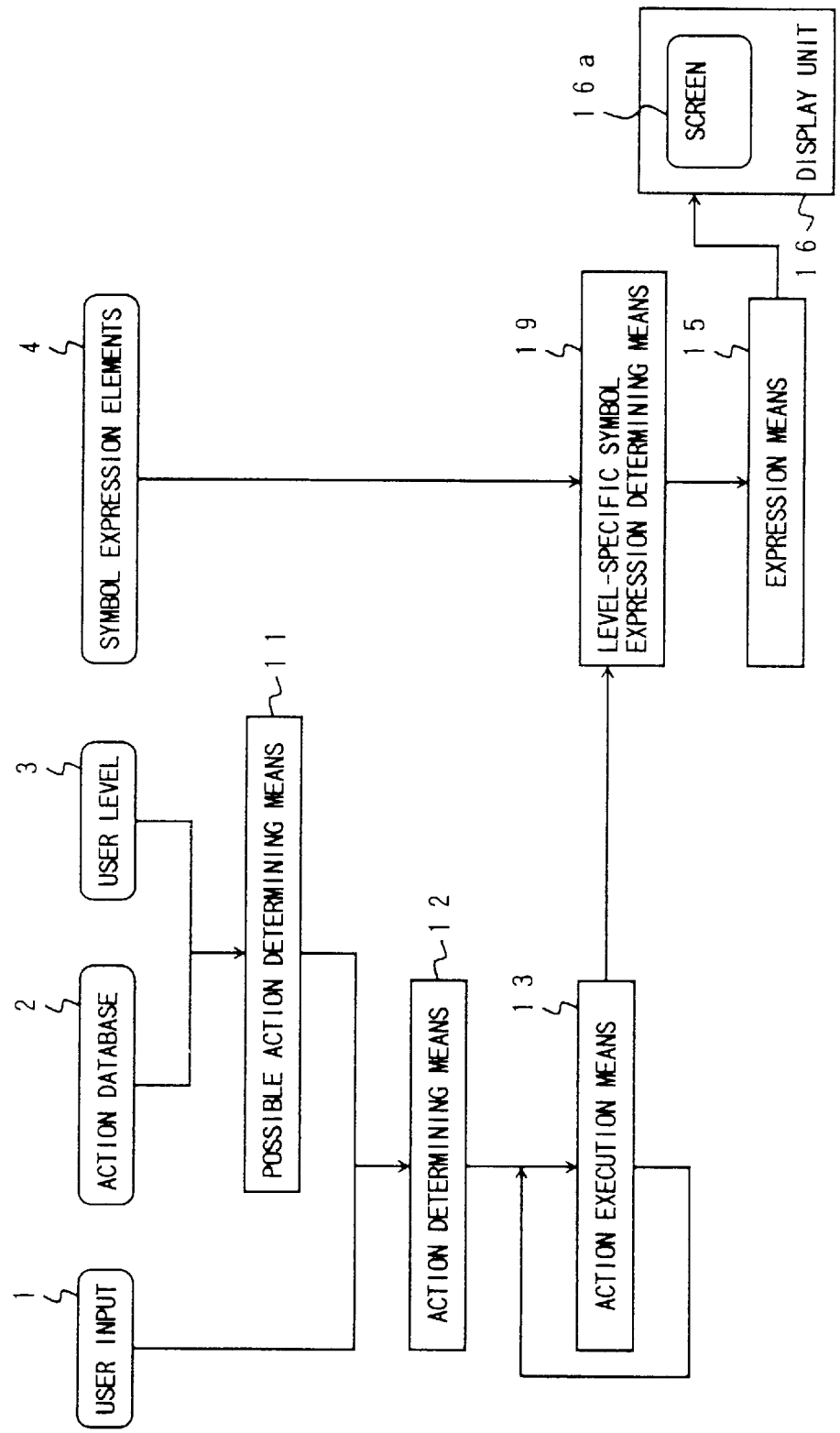
FIG. 5 is a schematic diagram showing a functional structure of a communication apparatus according to third embodiment of the present invention.
Figure 6:
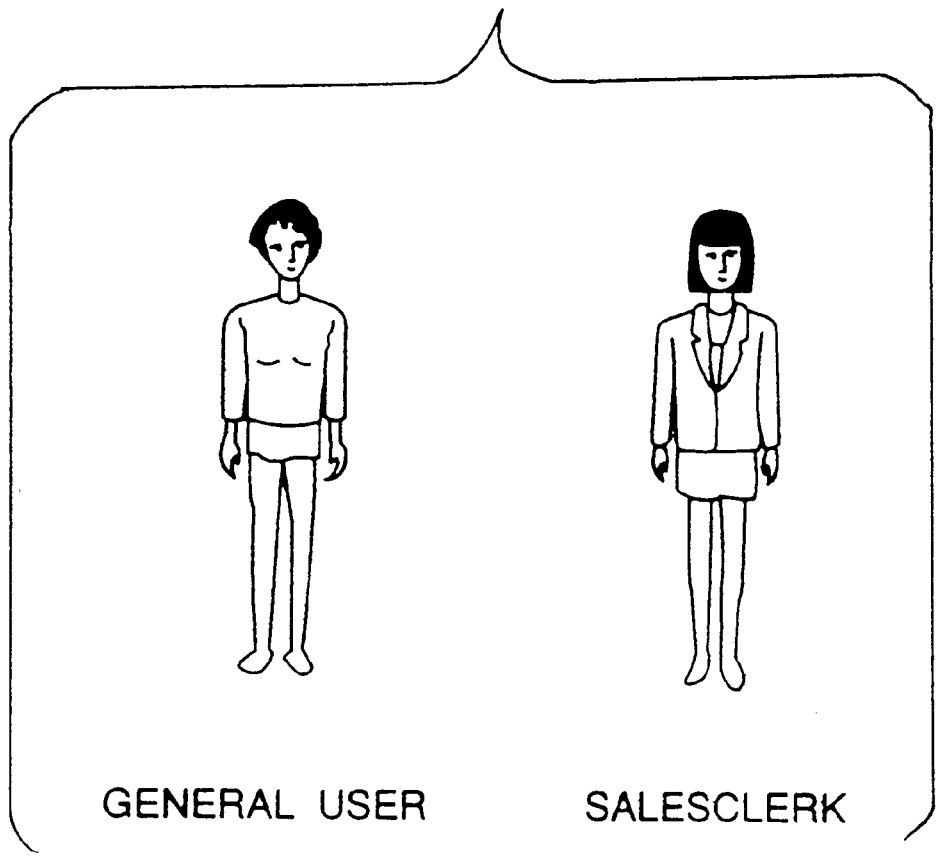
FIG. 6 is an illustration of images of symbols plotted on the display screen in connection with the third embodiment of the present invention.

FIG. 5 is a schematic diagram showing a functional structure of a communication apparatus according to third embodiment of the present invention. FIG. 6 is an illustration of images of symbols plotted on the display screen in connection with the third embodiment of the present invention shown in FIG. 3.

As compared with the communication apparatus shown in FIG. 1, the communication apparatus shown in FIG. 5 has a level-specific symbol expression determining means 19 for determining a user level-specific symbol expression on the basis of information of user level 3 entered, instead of the symbol expression determining means 14 in the communication apparatus shown in FIG. 1. The level-specific symbol expression determining means 19 alters an expression of one's own symbol between the case of belonging to a category of "general user" and the case of belonging to a category of "salesclerk", as shown in FIG. 6, according as user level 3 of one's own symbol belongs to what category, taking account of not only symbol expression elements 4 but also user level 3 of one's own symbol, when determining an expression of one's own symbol who executed oneself action by action execution means 13, the expression being caused by the executed action.

FIG. 7 is a schematic diagram showing a functional structure of a communication apparatus according to fourth embodiment of the present invention. FIGS. 8(A)–8(B) are views showing various user's status tables in connection with the fourth embodiment of the present invention.

As compared with the communication apparatus shown in FIG. 1, the communication apparatus shown in FIG. 7 has additionally user's possession database 5 and user level determining means 20. The user's possession database 5 records therein a corresponding relation between a possession of a user (symbol) in the virtual world and a level (category) of the user (symbol).

The communication apparatus shown in FIG. 7 incorporates thereinto a user status table in which the present status of one's own symbol is recorded. According to the present embodiment, in the user status table, there are provided "columns" as shown in FIGS. 8 (A)–(B) in which recorded are "certificate of general user 1", "certificate of general user 2" and "certificate of salesclerk" according to the associated communication apparatuses, respectively.

Returning to FIG. 7, the user level determining means 20 refers to the user's possession database 5 to determine one's own user level (category) from one's own possession recorded in the column of "possessions" of the user status table in which the present status of one's own symbol is recorded. The possible action determining means 11 refers to the action database 2 to determine an possible action content of one's own symbol in the virtual world on the basis of user's level (category) 3 determined by the user level determining means 20.

Figure 9:
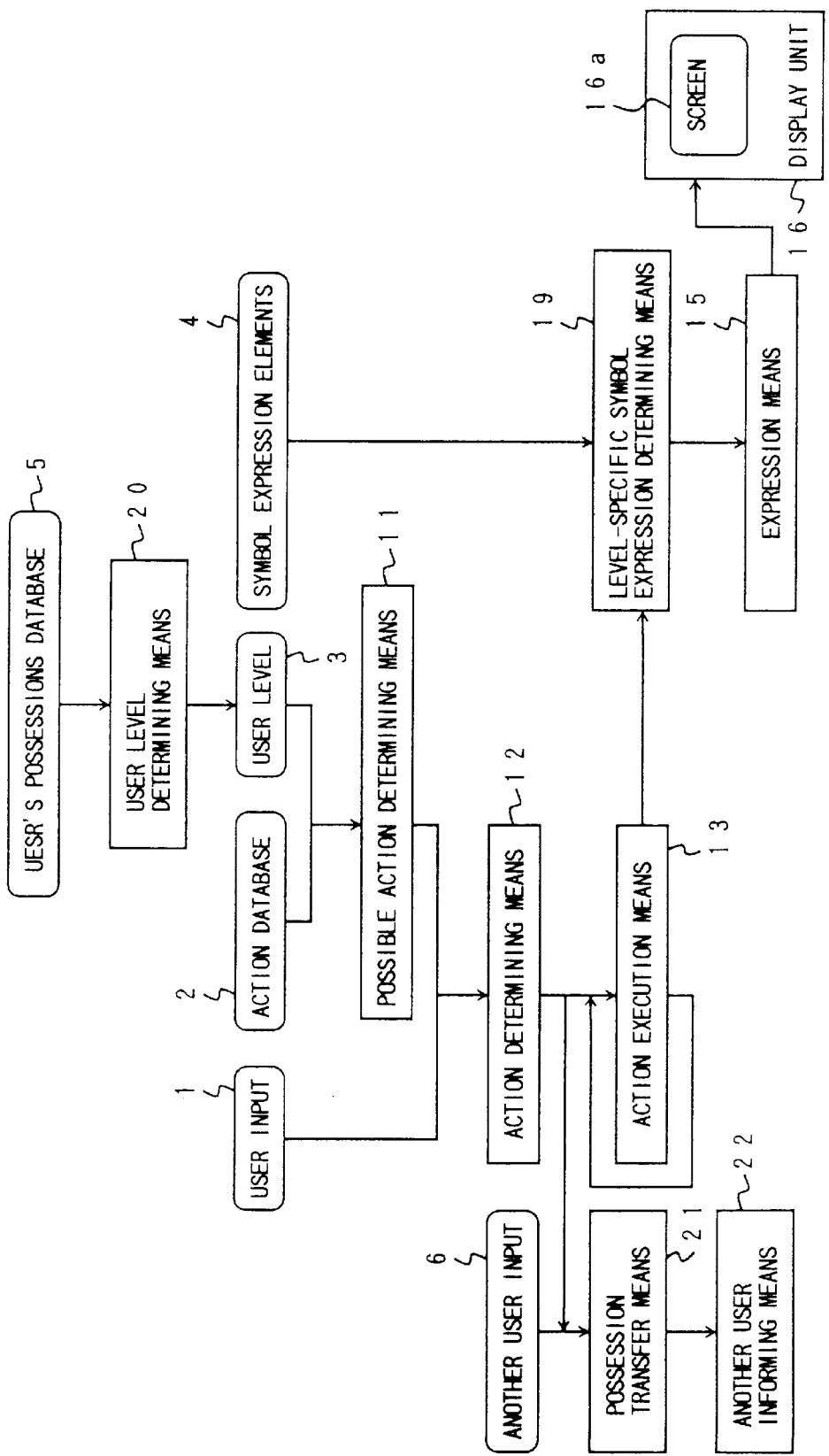
FIG. 9 is a schematic diagram showing a functional structure of a communication apparatus according to fifth embodiment of the present invention.

FIG. 9 is a schematic diagram showing a functional structure of a communication apparatus according to fifth embodiment of the present invention. FIGS. 10(A) and 10(B) are each an explanatory view useful for understanding an operation of the communication apparatus shown in FIG. 9.

Figure 10:
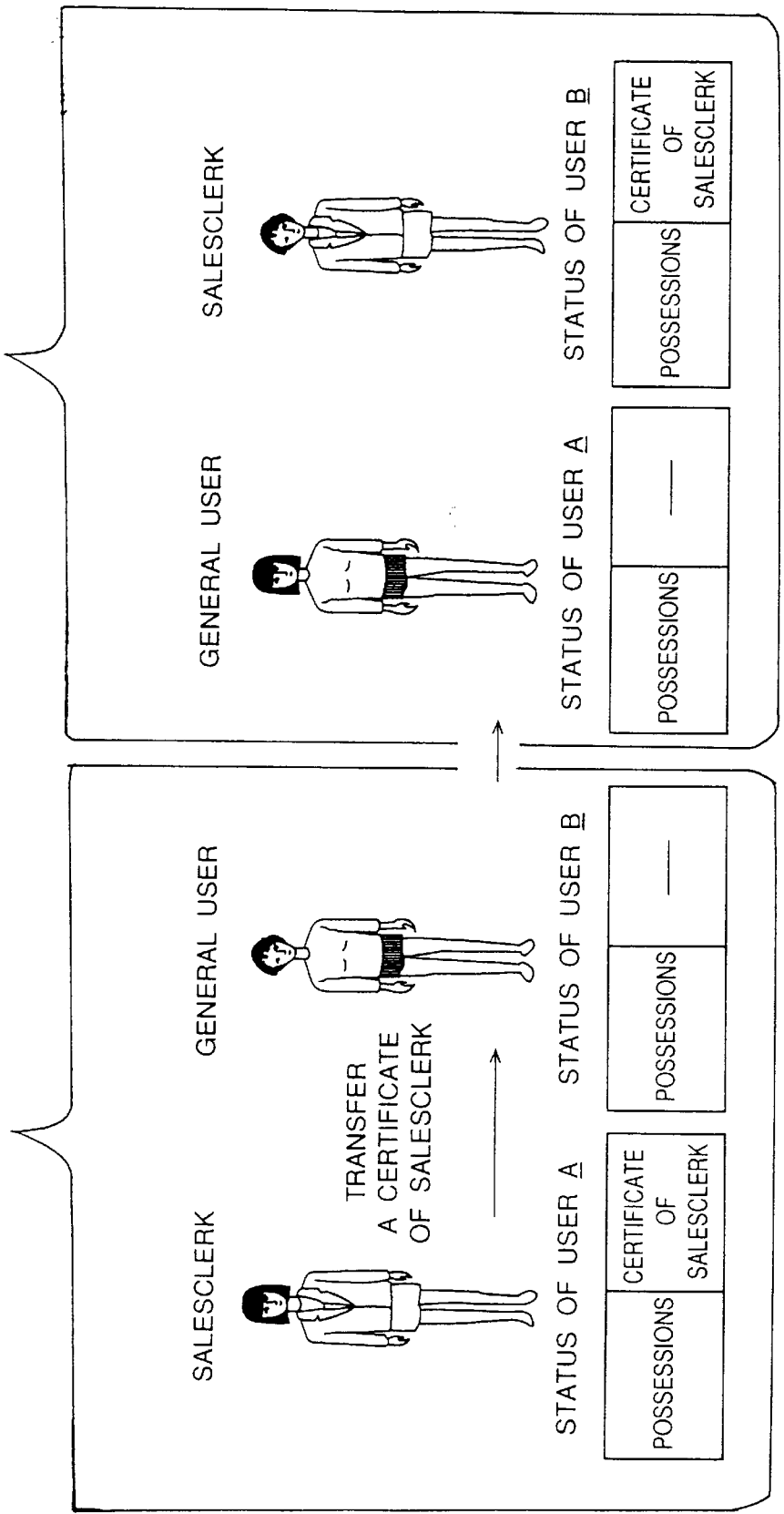
FIGS. 10(A) and 10(B) are each an explanatory view useful for understanding an operation of the communication apparatus shown in FIG. 9.

First, there will be explained the communication apparatus according to fifth embodiment of the present invention, referring to FIG. 10. It is assumed that one's own self is user A and one's own symbol has, as shown in FIG. 10(A), a "certificate of salesclerk" as the "possession". The "certificate of salesclerk" which user A possesses is transferred to user B, as shown in FIG. 10(B).

The communication apparatus shown in FIG. 9 has a possession transfer means 21 for transferring one's own possession (e.g. "certificate of salesclerk" in FIG. 10(A)) to another user (user B) in accordance with the action for transfer of the possession, which is determined by the action determining means 12, and an input (another user input 6) of agreement of transfer from another user (user B), and reflecting a result of the transfer on the column of "possessions" of user's status table of one's own self. As a result, when the user level (category) of one's own self is altered, one's own symbol is altered by the level-specific symbol expression determining means 19. The another user informing means 22 informs the communication apparatus of party in transfer of the fact that the possession has been transferred by the possession transfer means 21. Also in the communication apparatus of party, upon receipt of the notification, the column of "possessions" of user's status table of one's own self is rewritten.

Figure 11:
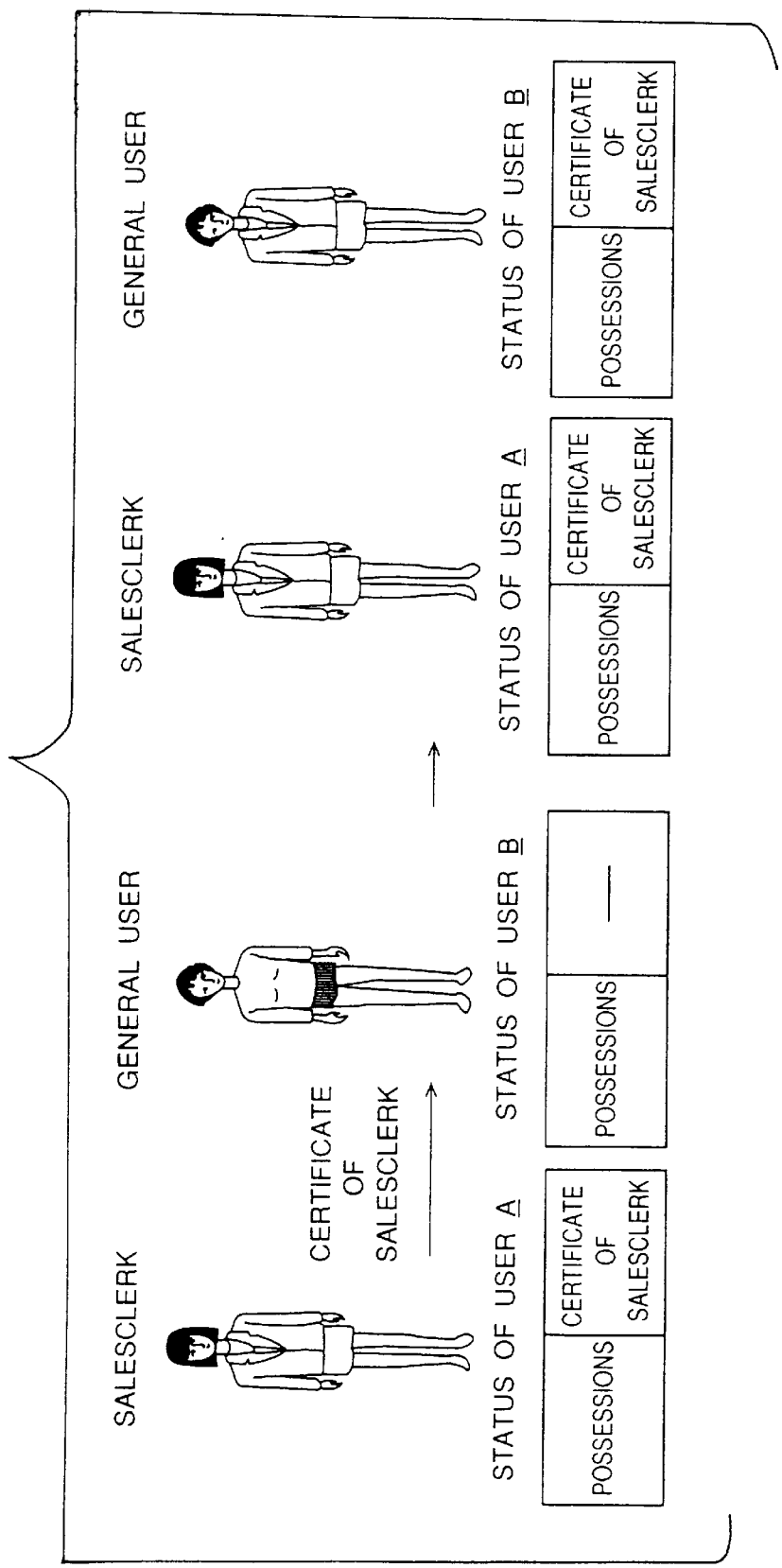
FIG. 11 is an explanatory view useful for understanding another way of transfer in the communication apparatus shown in FIG. 9.

FIG. 11 is an explanatory view useful for understanding another way of transfer in the communication apparatus shown in FIG. 9.

In the possession transfer means 21 shown in FIG. 9, "certificate of salesclerk" of user A is copied, and the copied "certificate of salesclerk" is transferred to user B.

In this manner, it is either acceptable that the possession is transferred without being copied or with being copied in accordance with possessions or situations.

FIG. 12 is a schematic diagram showing a functional structure of a communication apparatus according to sixth embodiment of the present invention. FIGS. 13(A), 10(B) and 13(C) are each an explanatory view useful for understanding an operation of the communication apparatus shown in FIG. 12.

First, there will be explained the communication apparatus according to sixth embodiment of the present invention, referring to FIGS. 13(A), 10(B) and 13(C).

FIG. 13(A) shows an operation selection menu which is opened on the communication apparatus according to sixth embodiment. When this menu is opened, there are displayed an icon of "user's operation" in which an user operates the communication apparatus on one's own to move one's own symbol, and an icon of "automatic operation" in which the communication apparatus automatically moves one's own symbol in accordance with a predetermined action program, for example, as shown in FIG. 10(B).

Clicking the icon of "automatic operation" permits one's own symbol to automatically move in accordance with a predetermined action program, for example, as shown in FIG. 10(C), without the user's manual operation.

The communication apparatus shown in FIG. 12 has an automatic input means 23 for inputting information as to automatic action of the symbol, as explained referring to FIGS. 13(A), 10(B) and 13(C). The action determining means 12 determines an action of the symbol in accordance with the inputted information as to the automatic action of the symbol.

Figure 14:
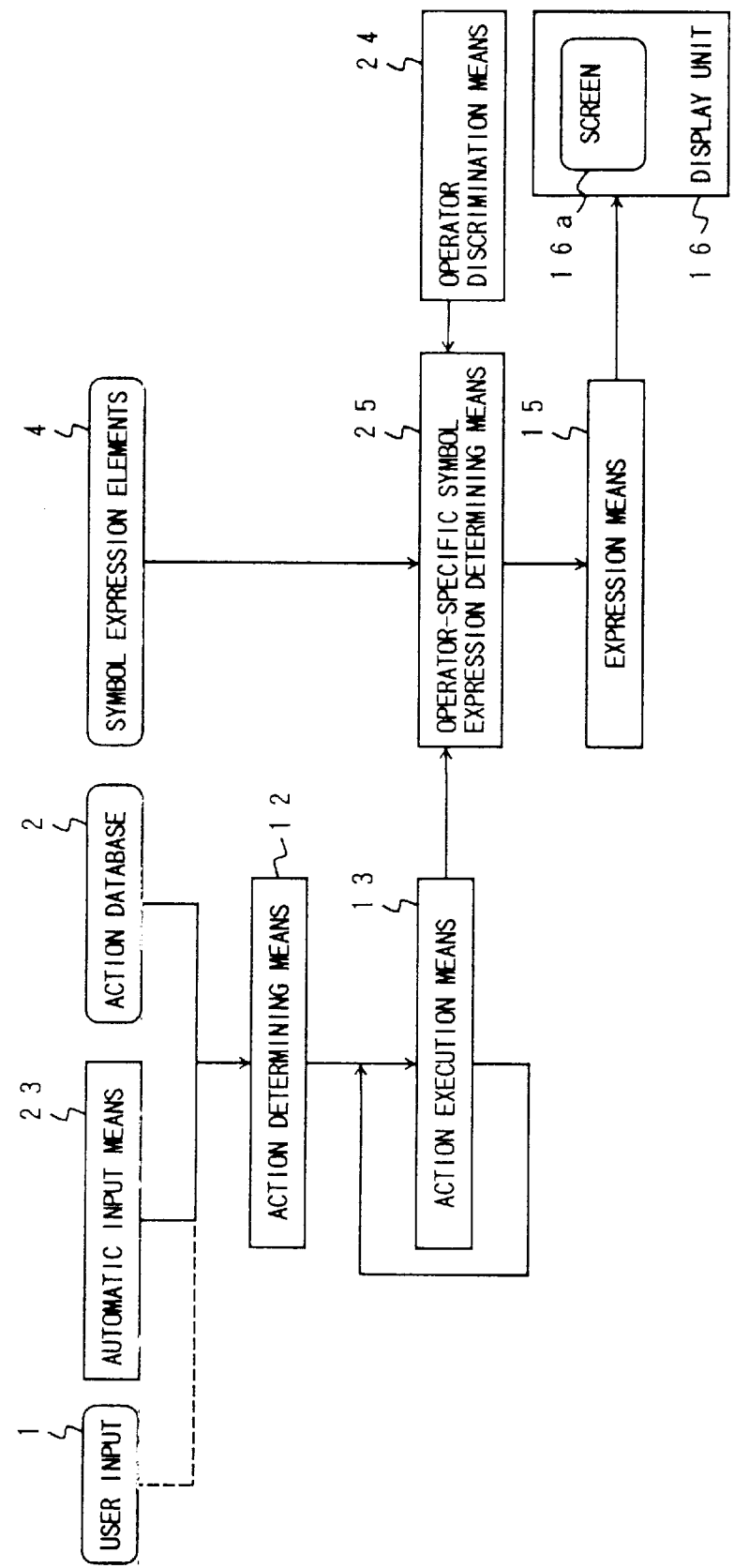
FIG. 14 is a schematic diagram showing a functional structure of a communication apparatus according to seventh embodiment of the present invention.
Figure 15:
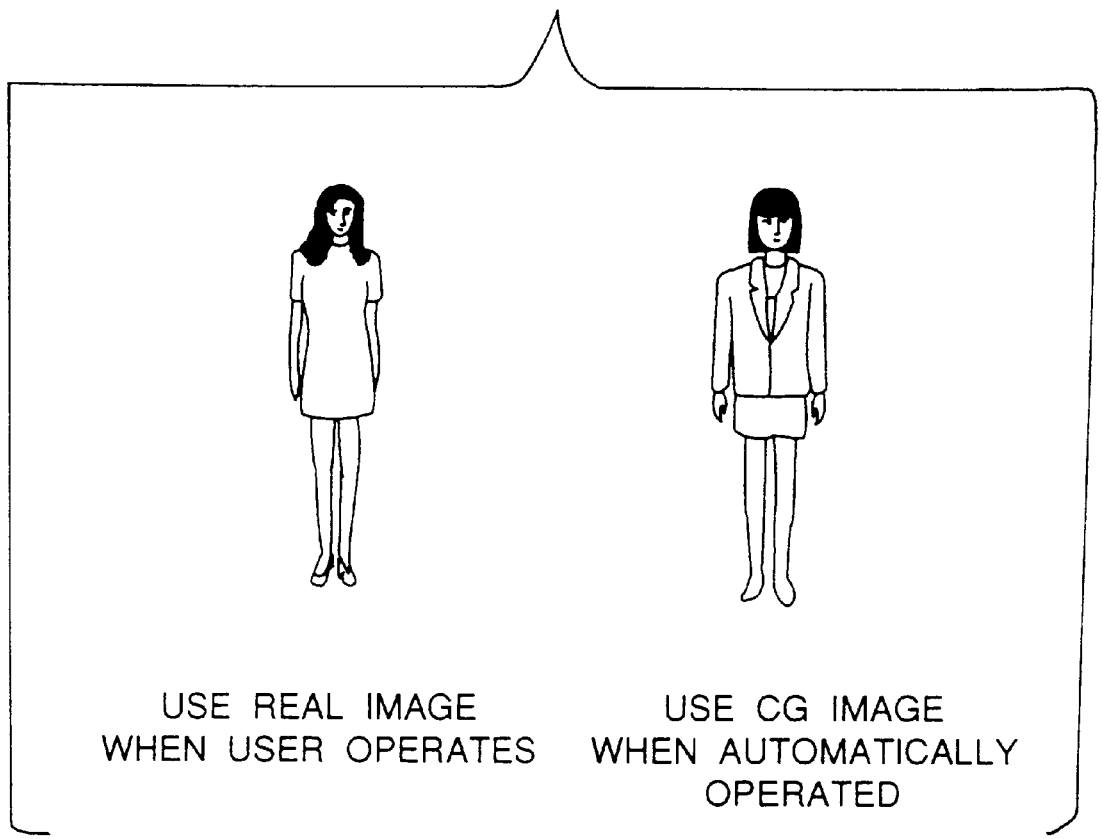
FIG. 15 is an explanatory view useful for understanding an operation of the communication apparatus shown in FIG. 14.

FIG. 14 is a schematic diagram showing a functional structure of a communication apparatus according to seventh embodiment of the present invention. FIG. 15 is an explanatory view useful for understanding an operation of the communication apparatus shown in FIG. 14.

The communication apparatus shown in FIG. 14 has an operator discrimination means 24 and an "operator-specific symbol expression determining means" 25 taking the place of the symbol expression determining means 14 in the communication apparatus shown in FIG. 12. The operator discrimination means 24 discriminates as to whether an operator for action of one's own symbol is the user or the machine itself (automatic input means 23). The operator-specific symbol expression determining means 25 alters the expression of one's own symbol in accordance with a result of discrimination by the operator discrimination means 24. According to the example shown in FIG. 15, when the user manually operates, there is used, as one's own symbol, a real image which are obtained through actually taking a photograph of the user and reading the photograph into the system. On the other hand, when automatically operated (machine operation), there is used, as one's own symbol, a computer graphics (CG) image produced by the CG technology.

As mentioned above, according to the present invention, it is possible to provide a communication apparatus suitable for a message communication system in which a symbol with a great deal of individuality is produced, so that a virtual world full of variety may be implemented.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A communication apparatus, adapted to be used as a user terminal, connected to a message communication system in which a plurality of user terminals are interconnected, the plurality of user terminals sharing virtual spaces and symbols each defined for an associated one of the user terminals and acting in the virtual space in accordance with an instruction from the associated user terminal, and messages are exchanged among the plurality of user terminals while an image representative of a virtual world, in which the symbols are arranged in the virtual space, is displayed in the respective user terminals, said communication apparatus comprising:

possible action determining means for determining a possible action content of one's own symbol in accordance with a category to which one's own symbol defined on one's own communication apparatus belongs, among a plurality of categories each defining a possible action content permitted as an action of the symbol in the virtual world;

action determining means for determining an action of said one's own symbol within a limit of the possible action content determined by said possible action determining means;

action execution means for causing said one's own symbol to execute the action determined by said action determining means;

symbol expression determining means for determining an expression of said one's own symbol executed by the action of said action execution means, the expression of said one's own symbol being caused by the executed action; and expression means for expressing as an image the symbol having the expression determined by said symbol expression determining means, wherein said symbol expression determining means alters the expression of said one's own symbol in accordance with a category to which said one's own symbol belongs.

2. A communication apparatus according to claim 1, further comprising category alteration means for altering a category of said one's own symbol in accordance with a behavior of said one's own symbol in the virtual world.

3. A communication apparatus according to claim 1, wherein said one's own symbol is permitted to possess a predetermined possession defining a category of said one's own symbol in the virtual world, and said possible action determining means determines a possible action content of said one's own symbol in accordance with the predetermined possession which said one's own symbol possesses.

4. A communication apparatus according to claim 3, further comprising possession transfer means for transferring one's own possession defining a category of said one's own symbol to another symbol.

5. A communication apparatus according to claim 3, further comprising possession transfer means for transferring one's own possession defining a category of said one's own symbol to another symbol, upon copying and holding the same as one's own possession.

6. A communication apparatus according to claim 1, further comprising automatic input means for automatically inputting an action of said one's own symbol in accordance with a predetermined program.

7. A communication apparatus according to claim 6, wherein said symbol expression determining means alters the expression of said one's own symbol, when an action of said one's own symbol is automatically inputted by said automatic input means, to an expression for action automatic input.

8. A communication apparatus, adapted to be used as a user terminal, connected to a message communication system in which a plurality of user terminals are interconnected, the plurality of user terminals sharing virtual spaces and symbols each defined for an associated one of the user terminals and acting in the virtual space in accordance with an instruction from the associated user terminal, and messages are exchanged among the plurality of user terminals while an image representative of a virtual world, in which the symbols are arranged in the virtual space, is displayed in the respective user terminals, said communication apparatus comprising:

possible action determining means for determining a possible action content of one's own symbol in accordance with a category to which one's own symbol defined on one's own communication apparatus belongs, among a plurality of categories each defining a possible action content permitted as an action of the symbol in the virtual world;

action determining means for determining an action of said one's own symbol within a limit of the possible action content determined by said possible action determining means;

action execution means for causing said one's own symbol to execute the action determined by said action determining means;

symbol expression determining means for determining an expression of said one's own symbol executed by the action of said action execution means, the expression of said one's own symbol being caused by the executed action;

expression means for expressing as an image the symbol having the expression determined by said symbol expression determining means; and possession transfer means for transferring one's own possession defining a category of said one's own symbol to another symbol.

9. A communication apparatus, adapted to be used as a user terminal, connected to a message communication system in which a plurality of user terminals are interconnected, the plurality of user terminals sharing virtual spaces and symbols each defined for an associated one of the user terminals and acting in the virtual space in accordance with an instruction from the associated user terminal, and messages are exchanged among the plurality of user terminals while an image representative of a virtual world, in which the symbols are arranged in the virtual space, is displayed in the respective user terminals, said communication apparatus comprising:

possible action determining means for determining a possible action content of one's own symbol in accordance with a category to which one's own symbol defined on one's own communication apparatus belongs, among a plurality of categories each defining a possible action content permitted as an action of the symbol in the virtual world;

action determining means for determining an action of said one's own symbol within a limit of the possible action content determined by said possible action determining means;

action execution means for causing said one's own symbol to execute the action determined by said action determining means;

symbol expression determining means for determining an expression of said one's own symbol executed by the action of said action execution means, the expression of said one's own symbol being caused by the executed action;

expression means for expressing as an image the symbol having the expression determined by said symbol expression determining means; and possession transfer means for transferring one's own possession defining a category of said one's own symbol to another symbol, upon copying and holding the same as one's own possession.

10. A communication method, comprising the steps of:

determining a possible action content of one's own symbol in accordance with a category to which one's own symbol defined on ones' own communication apparatus belongs, among a plurality of categories each defining a possible action content permitted as an action of the symbol in a virtual world;

determining an action of said one's own symbol within a limit of the possible action content;

causing said one's own symbol to execute the action;

determining an expression of said one's own symbol executed by the expression of said one's own symbol being caused by the executed action;

expressing as an image the symbol having the expression previously determined; and altering the expression of said one's own symbol in accordance with the category to which said one's own symbol belongs.

* * * * *